Oct. 27, 1925.                    1,558,585
H. BOYKOW
METHOD AND STEREOSCOPIC DEVICE FOR REPRODUCING OBJECTS
Filed Feb. 25, 1921

Inventor:
Hans Boykow
by
Leo J. Matty
attorney

Patented Oct. 27, 1925.

1,558,585

UNITED STATES PATENT OFFICE.

HANS BOYKOW, OF SCHONEBERG, NEAR BERLIN, GERMANY, ASSIGNOR TO THE FIRM OPTISCHE ANSTALT C. P. GOERZ AKTIENGESELLSCHAFT, OF FRIEDENAU, NEAR BERLIN, GERMANY.

METHOD AND STEREOSCOPIC DEVICE FOR PRODUCING OBJECTS.

Application filed February 25, 1921. Serial No. 447,903.

(GRANTED UNDER THE PROVISIONS OF THE ACT OF MARCH 3, 1921, 41 STAT. L., 1313.)

*To all whom it may concern:*

Be it known that I, HANS BOYKOW, a citizen of the Czechoslovakian Republic, residing at Schoneberg, near Berlin, Germany, have invented certain new and useful Improvements in Methods and Stereoscopic Devices for Reproducing Objects (for which I have filed applications in Germany February 23rd, 1920; Austria February 8th, 1921; Holland February 12th, 1921; Switzerland February 15th, 1921; France February 19th, 1921; Italy February 22nd, 1921; Belgium February 23rd, 1921, and an English Patent No. 159,192, granted August 11, 1921, on an application filed February 17, 1921), of which the following is a specification.

The utilization of aerial photographs and other stereoscopic photographs of three-dimensional objects for topographical purposes as a basis for fixing the position in space of the various parts of the object, necessitates determination of the position of the lens and of the position of the plates in space during the exposures. The determination of these three-dimensional co-ordinates offers great difficulties. The object of the invention is to avoid this difficulty in stereoscopic topography, that is to say in the reproduction of three-dimensional objects which require, for their complete reproduction, a number of partial photographs, or to reduce the difficulty to a single set of partial photographs. The object of the invention is attained by the pairs of plates obtained by consecutive partial stereoscopic exposures, being so combined to obtain optical three-dimensional images that the optical three-dimensional image of one pair of plates, that is to say the three-dimensional image obtained by looking through a stereoscope, is superposed on the optical three-dimensional image of the next pair of plates in such a manner that common registering points on the two photographs coincide exactly. When that is the case, then the two pairs of plates must be in correct relative position which agrees exactly with that relative position which the plates had to each other during the two partial stereoscopic exposures. If therefore the position in space of the lenses and of the plates for one set of photographs is known, then it is possible to determine directly from this known position, the position and orientation of the lenses and of the plates of the second set of partial stereoscopic photographs, that is to say readings of these quantities may be obtained from the apparatus. The same determination can then be effected for the other adjoining partial stereoscopic photographs.

To explain the invention and the method of carrying it into effect, reference will be made to the accompanying chiefly diagrammatic figures.

In the drawings—

Figure 1:
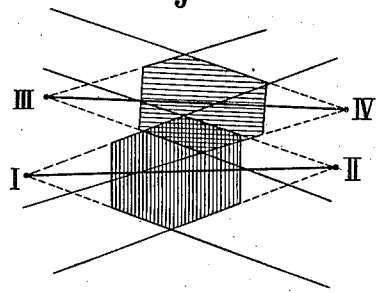
Figure 1 shows two consecutive partial stereoscopic exposures.

In Figure 1 it is assumed that two consecutive stereoscopic photographs were taken with the lenses first at I and II, and then at III and IV, and that the photographs give landscape sections of certain angular extents, the limits of which are indicated in the drawing. The photographs are taken so that the landscape sections partly overlap each other. The overlapping section is indicated in the drawing by double cross-hatching, while the other portions of the landscape sections taken in the single photographs, are cross-hatched only. The amount of overlap of the landscape sections is immaterial; it is sufficient in principle that the adjacent landscape sections should adjoin each other in a line.

Figure 2:
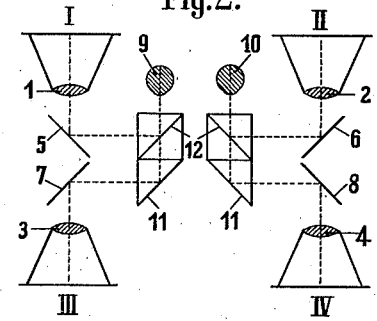
Figure 2 is the diagram of an optical device for effecting the stereoscopic measurement by registering according to the invention.

Two pairs of plates are obtained by the two consecutive stereoscopic exposures, each pair enabling, as is well known, an optical three-dimensional image to be obtained of the landscape section appearing on the plates by viewing the plates in a stereoscope. In Figure 2 the pairs of plates which correspond to the two consecutive partial stereoscopic exposures, are marked, in accordance with the places from which the photographs were taken in Figure 1, I, II, or III, IV. The lenses of the stereoscope are marked 1, 2, 3, 4. In front of the lenses 1 to 4 are arranged mirrors 5 to 8, and in front of the latter are again arranged prism devices by means of which the images of the plates I and III or II and IV superimposed in register in the eyes 9 and 10 of the spectator. The prism device used for the purpose, is well known, and each prism combination has one reflecting surface 11, and a reflecting, and at the same time transparent, surface 12, so that the images coming from 7, 8 are brought to the spectator by the surfaces 11 through the surfaces 12, whilst the rays coming from 5 and 6 are reflected by the surfaces 12, and in that way also reach the eye of the spectator.

The figure shows that with the optical device shown diagrammatically, optical three-dimensional images of two different sets of partial stereoscopic photographs can be superimposed in register. Owing to a suitably adjustable arrangement of the stereoscopic elements of the device or of the cameras carrying the lenses 1–4 together with the corresponding plates I–IV, it is possible to obtain any desired movement and adjustment of the optical three-dimensional images relatively to each other, more particularly an exact registering of the landscape section common to both partial photographs. The exact registration or coincidence of this landscape section common to both partial photographs, is an indication that the cameras with the plates are in the same relative position, in an inverted sense, as during the exposure itself. The determination of the position of the cameras with the plates in the apparatus gives therefore at the same time an indication of the position during the exposure.

Figure 3:
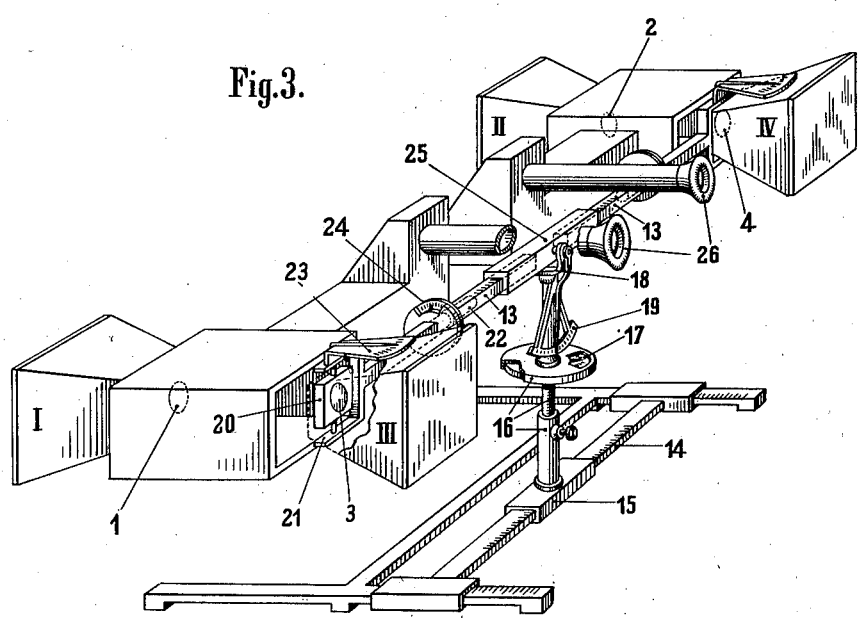
Figure 3 shows an apparatus for superposing the optical three-dimensional images of two consecutive stereoscopic partial photographs.

In the device for bodily realizing the conditions of Figure 2, which is illustrated in Figure 3, the plates are again marked I, II, III, IV. The lenses are marked 1–4 as in Figure 2. The mirror- and prism arrangement is not shown separately, it being assumed to agree in principle with that of Figure 2. But the figure indicates the means for adjusting the relative position of the cameras with the plates and lenses. Each pair of cameras is mounted on a rigid bar 13, each of the cameras being marked as a whole for the sake of simplicity with the same reference mark as the plates, that is to say the cameras are designated I-IV. Only the bar for the pair of cameras III and IV is visible in the drawing. This bar is mounted on a three-dimensional carriage 14, 15, 16, one element 16 of which has a direction circle 17. The element 16 of the three-dimensional carriage terminates in a fork 18 in which the bar is mounted to rotate. A direction circle 19 makes it possible to determine the inclination of the bar.

The three-dimensional carriage 14, 15, 16 in combination with the two axes to which are allotted the direction circles 17 and 19, enables the bar 13 to be given any determinate angular position in space within the limits of the circles. The same arrangement as for the bar 13 of the cameras III and IV, is also provided for the bar supporting the cameras I and II so that both bars can be arranged in any desired position relatively to each other.

The cameras I and II, or III and IV, are in their turn adjustable relatively to the bars 13, in order to enable the position of the lenses and the plates to be modified as required in order to obtain the desired registering of the optical three-dimensional images. The lens board 20 of each of the four cameras, is universally adjustable in relation to the corresponding bar 13. The drawing shows the lens board 20 rotatably mounted in a frame 21 which is rotatably mounted by means of a cylindrical pin 22, in the bar. 23 and 24 are the scales which indicate any angular adjustment of the lens board in two mutually perpendicular planes. The bar 13 is provided with a divided scale of length and the two parts are adjustable in a sleeve 25, so that the distance between the lenses can be modified within the limits of the scale. 26 are the eye piece tubes through which the spectator sees the three-dimensional images obtained from the pairs of plates I, II or III and IV.

When using the apparatus, one set of plates, the positions of which during exposure are known, is inserted into one pair of cameras, say cameras I and II and these cameras are adjusted so that the partial indications on the apparatus agree with the known values during exposure. Such adjustment of the cameras results at the same time in an adjustment of the corresponding three-dimensional image.

The distance between the cameras III and IV is thereupon set in accordance with the length of the base during the exposure. The inclination of the plates to the base in one plane, for instance in the vertical plane is as a rule also known, or in the direction towards a fixed astronomical point etc. If that is the case, the said known angle is set on the corresponding circle. Thereupon, by operating the various adjusting devices, the two three-dimensional images are registered with each other, which can be facilitated by rapid alternate obscuration of each three-dimensional image in turn.

When the two pairs of cameras I, II and III, IV have been given correct relative orientation, a landscape zone which is situated in a plane in which the two three-dimensional images interpenetrate each other, must remain steady during the alternate obscuration of the images, while all the other points of the two three-dimensional images flicker to an extent depending on their distance from this zone of interpenetration of the two three-dimensional images. This zone common to two three-dimensional images is parallel to the image plane which is common to the two three-dimensional images. All the points of the two three-dimensional images, which remain steady when the well known "flicker" method is used, have therefore the same parallax. The equality of the parallax can be, as is well known, easily tested at any time by stereoscopic measuring marks. With some practice, it is therefore comparatively easy to produce the correct orientation by methodical moving and turning of the pair of cameras III, IV relatively to the pair of cameras I, II correctly set in space, by means of stereoscopic measuring marks.

As soon as this object has been attained, the adjustment values on the different divisions or scales give the values from which the positions of the lenses and of the plates during the exposure can be obtained.

In the same way as the optical three-dimensional images of landscape sections can be registered with each other in the manner described, it is of course also possible to register three-dimensional images of partial photographs of any other three-dimensional objects, and in that way to obtain the basis for determining their position in space.

It is not absolutely necessary to superimpose complete stereoscopic three-dimensional images in order to produce the registration of the parts appearing in both images. It is also sufficient to use with a complete stereoscopic image or optical three-dimensional image, a single photograph which shows some of the parts appearing in the first stereoscopic pair. Such a single photograph, together with each of the two images belonging to the stereoscopic pair, will also give a new stereoscopic image which will show the registered common zone. This enables one stereoscopic pair to be used in conjunction with a single photograph.

The stereoscopic image taken under known conditions which forms the basis for the process here described, could also be replaced by two single photographs taken from points separated in space at different times. The only condition is that the conditions of exposure for the two single photographs should be known. The single photographs could be combined in a similar manner as the two images of a stereoscopic photograph proper, and used for producing an optical three-dimensional image which can be used in the manner described herein for measurement by stereoscopic coincidence.

The described construction according to the invention, in which the stereoscopic photographs are viewed directly by the spectator after proper reflection of the images, represents merely one of many possibilities. Instead of viewing the images directly, it is possible for instance to project them on any desired surface (opaque plate, screen or the like) and then to view them stereoscopically.

The only essential point is that the projected images should be capable of being so shifted that identical points of two three-dimensional images can be seen by the eye at the same place, and that the fact that these points coincide should be recognized by merely viewing the flicker of the alternately projected images, with or without the aid of stereoscopic measuring marks.

The process described offers the possibility of measurement by stereoscopic means, in which even for taking an extensive section of landscape, no intermediate fixed points are required, that is to say no preliminary triangulation is necessary. Of course the results of the measurement according to the invention could be easily improved if the said measurement were to lead to new fixed points in the course of time. Equalization calculations are then possible and could be made in the usual way.

What I claim is:

1. In a method of stereoscopic topography, producing sets of stereoscopic photographs of overlapping parts of the three-dimensional object, adjusting them relatively to each other so that their optical three-dimensional images appear with identical overlapping parts in register, determining the adjusted positions of the photographs of the one set relatively to the positions of the photographs of the other set, and correlating the topographic reproduction of the part of the object corresponding to the one set of stereoscopic photographs, to the reproduction of the part of the object corresponding to the other set in accordance with the adjusted positions of the sets of photographs relatively to each other.

2. In a method of stereoscopic topography, producing a set of stereoscopic photographs of a part of the object to be topographically reproduced on plates in known positions within the space, and a further set of stereoscopic pictures of a part of the object different from the first part but overlapping same, at least one picture of said second set being taken from a position different from the position of the plates of the first set and unknown to the observer, adjusting said sets of pictures relatively to each other so that their optical three-dimensional images appear with identical overlapping parts in register, determining the adjusted positions of the photographs of the one set relatively to the positions of the photographs of the other set, and correlating the topographic reproduction of the part of the object corresponding to the one set of stereoscopic photographs to the reproduction of the part of the object corresponding to the other set in accordance with the adjusted positions of the sets of photographs relatively to each other.

3. In a method of stereoscopic topography, inserting into adjustable cameras the photographs of a stereoscopic set of partial photographs of the object to be reproduced taken in known positions within the space, adjusting the cameras in accordance with the exposure positions of the photographic plates, inserting into a further pair of adjustable cameras the photographs of a further set of stereoscopic partial photographs of the object, corresponding to a part of same overlapping the part corresponding to the first mentioned set, observing the photographs within the two pairs of adjustable cameras simultaneously with a suitable observation device, adjusting the said second pair of cameras with the photographs therein so as to obtain a three-dimensional image of the corresponding part of the object and to adjust it with relation to the three-dimensional image corresponding to the first set of partial photographs, so as to bring identical overlapping parts of the two three-dimensional images in register with each other.

4. A device for adjusting sets of stereoscopic photographs comprising a system of not less than three adjustable cameras each adapted to receive an image plate, a binocular observation device and means adapted to project the images on the plates within the cameras in two stereoscopically coordinated sets into the field of view of the binocular observation device so as to present two stereoscopic or three dimensional images interpenetrating each other to the observer.

5. A device for adjusting sets of stereoscopic photographs comprising two pairs of cameras and an observation device common to both said pairs of cameras, the cameras of each pair and the two pairs of cameras being adjustable relatively to each other.

6. A device for adjusting sets of stereoscopic photographs comprising two pairs of cameras and an observation device common to both said pairs of cameras, the cameras of each pair and the two pairs of cameras being adjustable relatively to each other, indicating means being provided to determine the adjusted positions of the cameras.

In testimony whereof I have signed this specification.

HANS BOYKOW.